No. 660,908. Patented Oct. 30, 1900.
B. G. LAMME.
VARIABLE SPEED ELECTRIC MOTOR.
(Application filed June 5, 1899.)

(No Model.)

WITNESSES:

INVENTOR
Benjamin G. Lamme
BY
Wesley G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF PENNSYLVANIA.

VARIABLE-SPEED ELECTRIC MOTOR.

SPECIFICATION forming part of Letters Patent No. 660,908, dated October 30, 1900.

Application filed June 5, 1899. Serial No. 719,428. (No model.)

*To all whom it may concern:*

Be it known that I, BENJAMIN G. LAMME, a citizen of the United States, residing at Pittsburg, in the county of Allegheny and State of Pennsylvania, have invented a new and useful Improvement in Variable-Speed Electric Motors, (Case No. 835,) of which the following is a specification.

My invention relates to electric motors, and particularly to machines of this general class which are designed and constructed for operation by direct currents.

The object of my invention is to provide a motor which may be operated economically at widely-varying speeds without depending wholly or even mainly upon variation in the field-magnet excitation of the motor. In order to accomplish this result, I propose to provide a motor with an armature having two windings and two commutators, the lengths of the two windings having approximately the ratio of forty to one hundred, and by means of suitable switching devices to connect the two windings in series for one rate of speed, to cut the shorter of the two windings out of circuit for a higher speed, to connect the windings in opposition for a still higher rate, and to cut the longer winding out of circuit for maximum speed, it being assumed that the electromotive force supplied to the armature remains substantially constant. I have found by computation and experiment that the ratio of forty to one hundred in the lengths of the two armature-windings insures an increase and decrease in speed by substantially equal steps, or as nearly equal as it is possible to secure by changing the relation and connection of the windings in circuit in the manner described. Of course this ratio need not be exact; but a variation of a comparatively few turns either way, so that the ratio is thirty-five to one hundred or forty-five to one hundred, for example, serves to make the steps widely unequal. If a more gradual variation in speed than that which is possible of attainment by the means described is desired, the field-magnet excitation may be varied between the steps described by means of a field-rheostat, as is usual in the art.

Figure 1:
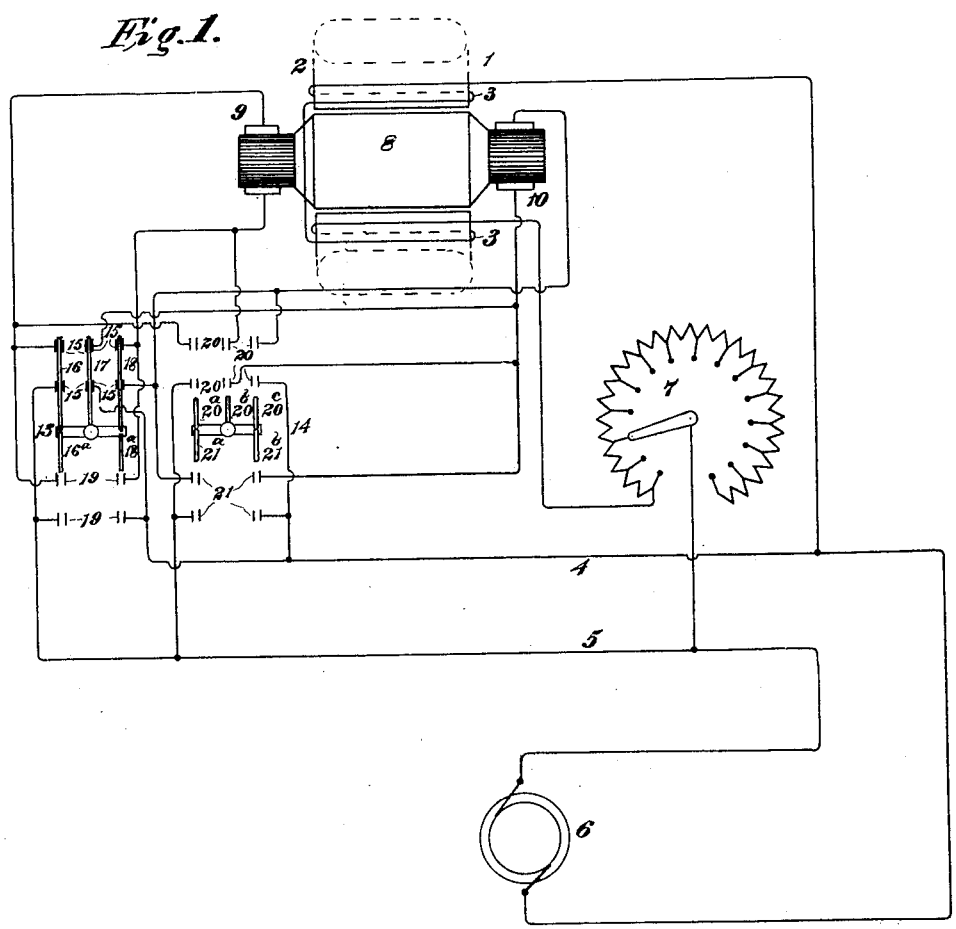
Figure 2:
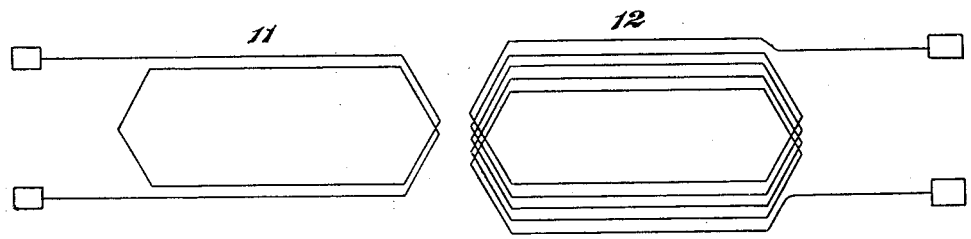

In the accompanying drawings, Figure 1 is a diagram of a motor and its supply-circuits and controlling devices embodying my invention, and Fig. 2 is a diagram illustrating a portion of the windings of the motor-armature.

The motor 1 has a field-magnet 2, provided with any desired or suitable number of poles, the exciting-coils 3 for such magnet being in this instance connected across a circuit 4 5, supplied by a direct-current generator 6. An adjustable rheostat 7 is provided in order that a greater or less amount of its resistance may be included in the field-magnet circuit for the purpose of regulation when desired. The armature 8 of the motor is provided with two separate windings, the lengths of which are in substantially the ratio of forty to one hundred. These windings are respectively connected to commutators 9 and 10, preferably located at opposite ends of the motor. The windings may be constructed and arranged in any suitable manner, provided they are so located as to be properly subjected to the magnetic field.

In Fig. 2 I have shown one coil 11 of two turns and a coil 12 of five turns as indicative of a form of winding suitable for my invention. These coils may conveniently be located in the same slots in the armature-core, the conductors at each side of each coil being either located side by side or superimposed. In the case of the coil having the greater number of turns it will probably be preferable to superpose the conductors occupying the same slot, they being shown in the drawings as side by side merely for convenience and clearness of illustration. A sufficient number of coils like each of those shown will be employed to complete the winding suitable for the size and character of the machine, as will be readily understood.

As a means for making the desired changes in the relation of the two windings I have shown in Fig. 1 two double-throw switches 13 and 14. On one side of the switch 13 are three pairs of stationary contact-terminals 15, with which coöperate the three blades 16, 17, and 18 pertaining to the movable member of the switch. On the other side of this switch are located two pairs of stationary contact-terminals 19 in position to be engaged, respectively, by blades 16ª and 18ª. The switch 14 is also provided with three pairs of stationary contact-terminals 20 at one side and two pairs of such terminals 21 at the other side and with a movable member having three blades 20ª, 20ᵇ, and 20ᶜ to engage the terminals 20 and two blades 21ª and 21ᵇ to engage terminals 21. When the blades 16, 17, and 18 of switch 13 are in engagement with the stationary contact-terminals 15, as indicated in the drawings, the two armature-windings are connected in series. If now this switch be thrown, so as to bring the blades 16ª and 18ª into engagement with the stationary terminals 19, the shorter armature-winding will be cut out of circuit. If this switch be opened and the switch 14 be thrown to bring the blades 20ª, 20ᵇ, and 20ᶜ into engagement with the stationary contact-terminals 20, the two armature-windings will be connected in opposition for the next higher rate of speed. If the switch be thrown in the opposite direction to bring the blades 21ª and 21ᵇ into engagement with the contact-terminals 21, the longer armature-winding will be cut out of circuit. A more gradual change in speed may be effected by moving the switch-arm of the rheostat 7 before throwing either of the switches to make any one of the changes described, so as to bring the speed of the motor, by variation of its field-magnet excitation, to substantially the value represented by the armature-circuit connections which it is desired to make by means of the switch.

While I have illustrated and described a two-circuit armature, I do not intend to restrict my invention to any specific number of such circuits. A greater number of circuits than two would, however, probably be too expensive and cumbersome to be desirable in practice, and hence I have not deemed it necessary or advisable to set forth specifically a motor and switching devices adapted for more than two armature-circuits.

I claim as my invention—

1. The method of varying the speed of a direct-current motor provided with a plurality of armature-windings of different lengths which consists in changing the relation and number of said windings in circuit and varying the exciting-current for the motor-field prior to each change in said windings.

2. The method of gradually varying the speed of a direct-current motor provided with two armature-windings of different lengths which consists in connecting said windings in series for one rate of speed, gradually reducing the exciting-current for the motor-field, cutting the shorter windings out of circuit, making a further reduction of the exciting-current for the motor-field, connecting the windings in opposition, again reducing the exciting-current, and finally cutting the longer winding out of circuit.

In testimony whereof I have hereunto subscribed my name this 3d day of June, 1899.

BENJ. G. LAMME.

Witnesses:
WESLEY G. CARR,
H. C. TENER.